(12) United States Patent
O'Neil

(10) Patent No.: US 10,390,091 B2
(45) Date of Patent: *Aug. 20, 2019

(54) METHOD AND APPARATUS FOR DELIVERING SELECTED MULTIMEDIA CONTENT TO A USER IN PERVASIVE COMPUTING ENVIRONMENTS

(71) Applicant: AT&T Intellectual Property II, L.P., Atlanta, GA (US)

(72) Inventor: Joseph Thomas O'Neil, Staten Island, NY (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/181,974

(22) Filed: Feb. 17, 2014

(65) Prior Publication Data

US 2014/0165096 A1    Jun. 12, 2014

Related U.S. Application Data

(63) Continuation of application No. 10/192,212, filed on Jul. 10, 2002, now Pat. No. 8,656,004.

(51) Int. Cl.
*H04N 21/466*   (2011.01)
*H04N 21/45*    (2011.01)
*H04L 29/08*    (2006.01)

(52) U.S. Cl.
CPC ...... *H04N 21/4667* (2013.01); *H04L 67/306* (2013.01); *H04N 21/4532* (2013.01); *H04L 29/08675* (2013.01)

(58) Field of Classification Search
CPC ....... H04L 67/02; H04L 67/10; H04L 67/306; H04L 29/08675; H04N 21/4532; H04N 21/4667

See application file for complete search history.

(56) References Cited

U.S. PATENT DOCUMENTS

| | | |
|---|---|---|
| 5,801,747 A | 9/1998 | Bedard |
| 6,016,520 A | 1/2000 | Facq et al. |
| 6,047,327 A | 4/2000 | Tso et al. |
| 6,104,334 A | 8/2000 | Allport |
| 6,130,726 A | 10/2000 | Darbee et al. |

(Continued)

FOREIGN PATENT DOCUMENTS

WO    WO 00/52928    9/2000

OTHER PUBLICATIONS

Lassila, Ora, "Web Metadata: A Matter of Semantics", Internet Computing, IEEE, Jul./Aug. 1998, vol. 2, Issue 4, pp. 30-37.

(Continued)

*Primary Examiner* — Patrice L Winder

(57) ABSTRACT

A method and apparatus for delivering selected multimedia content to a user of a mobile device in a pervasive computing environment is disclosed. Communications with a mobile device in the environment is established. A user profile and viewing history is received from the mobile device. Multimedia content is selected and sequenced for viewing by the user. The selection of multimedia content is based on search logic that includes the user profile and viewing history. Metadata is transmitted to the mobile device that is associated with the selected multimedia content.

17 Claims, 13 Drawing Sheets

(56) References Cited

U.S. PATENT DOCUMENTS

| | | | |
|---|---|---|---|
| 6,199,076 B1* | 3/2001 | Logan | H04N 21/4307 434/319 |
| 6,349,410 B1* | 2/2002 | Lortz | H04N 5/76 375/E7.021 |
| 6,407,779 B1 | 6/2002 | Herz | |
| 6,463,518 B1 | 10/2002 | Duboc | |
| 6,651,253 B2 | 11/2003 | Dudkiewicz et al. | |
| 6,687,740 B1 | 2/2004 | Gough et al. | |
| 6,714,797 B1 | 3/2004 | Rautila | |
| 6,728,173 B2 | 4/2004 | Beach et al. | |
| 6,760,601 B1 | 7/2004 | Suoknuuti et al. | |
| 6,763,343 B1 | 7/2004 | Brooke et al. | |
| 6,771,749 B1 | 8/2004 | Bansal et al. | |
| 6,772,160 B2 | 8/2004 | Cho et al. | |
| 6,782,253 B1* | 8/2004 | Shteyn | H04L 67/18 455/414.1 |
| 6,925,595 B1* | 8/2005 | Whitledge et al. | 709/219 |
| 6,947,922 B1* | 9/2005 | Glance | G06F 17/30017 705/26.1 |
| 6,978,258 B2* | 12/2005 | Chithambaram | G06N 5/048 706/1 |
| 7,055,168 B1* | 5/2006 | Errico | G06F 17/30029 348/E7.061 |
| 7,099,946 B2 | 8/2006 | Lennon et al. | |
| 7,277,928 B2 | 10/2007 | Lennon | |
| 7,340,438 B2* | 3/2008 | Nordman | H04L 63/0407 705/51 |
| 7,415,439 B2* | 8/2008 | Kontio et al. | 709/217 |
| 7,451,177 B1* | 11/2008 | Johnson | H04N 21/4825 455/3.01 |
| 7,490,045 B1* | 2/2009 | Flores | G06Q 10/10 702/62 |
| 7,493,312 B2 | 2/2009 | Liu et al. | |
| 7,496,947 B1* | 2/2009 | Meyers | H04N 21/475 725/44 |
| 7,529,639 B2* | 5/2009 | Rasanen | H04W 4/02 702/150 |
| 7,533,400 B1 | 5/2009 | Hailey et al. | |
| 7,603,110 B2* | 10/2009 | Zellner | H04L 67/20 455/404.2 |
| 7,614,081 B2* | 11/2009 | Prohel | H04L 67/104 709/223 |
| 8,260,656 B1* | 9/2012 | Harbick | G06Q 30/02 705/26.7 |
| 8,650,496 B1* | 2/2014 | Van Gestel | H04B 1/034 340/539.11 |
| 9,286,294 B2* | 3/2016 | Asmussen | G06F 17/30017 |
| 2001/0034736 A1 | 10/2001 | Eylon et al. | |
| 2001/0039659 A1* | 11/2001 | Simmons | H04N 7/17336 725/61 |
| 2001/0047357 A1 | 11/2001 | Vaithilingam et al. | |
| 2002/0049717 A1* | 4/2002 | Routtenberg | H04N 21/252 |
| 2002/0056114 A1* | 5/2002 | Fillebrown | G06F 1/1626 725/78 |
| 2002/0066026 A1 | 5/2002 | Yau et al. | |
| 2002/0078818 A1 | 6/2002 | Elliott | |
| 2002/0084898 A1 | 7/2002 | Stefanik | |
| 2002/0092019 A1 | 7/2002 | Marcus | |
| 2002/0107985 A1* | 8/2002 | Hwang et al. | 709/246 |
| 2002/0133821 A1* | 9/2002 | Shteyn | H04N 21/4126 725/46 |
| 2002/0144007 A1* | 10/2002 | Shteyn | G06Q 30/02 719/313 |
| 2002/0151327 A1* | 10/2002 | Levitt | G06F 17/30867 455/556.1 |
| 2002/0152267 A1 | 10/2002 | Lennon | |
| 2002/0152318 A1 | 10/2002 | Menon et al. | |
| 2002/0161476 A1* | 10/2002 | Panofsky | G06Q 20/1235 700/231 |
| 2002/0184095 A1 | 12/2002 | Scullard et al. | |
| 2003/0009589 A1 | 1/2003 | Apostolopoulos et al. | |
| 2003/0023427 A1* | 1/2003 | Cassin | H04N 7/17318 704/201 |
| 2003/0028889 A1* | 2/2003 | McCoskey | H04N 7/17318 725/91 |
| 2003/0032409 A1* | 2/2003 | Hutcheson | H04L 67/20 455/414.1 |
| 2003/0061206 A1* | 3/2003 | Qian | 707/3 |
| 2003/0061298 A1 | 3/2003 | Berman et al. | |
| 2003/0068974 A1* | 4/2003 | Kanamaluru | G06F 17/30867 455/3.06 |
| 2003/0069964 A1* | 4/2003 | Shteyn | H04L 67/06 709/225 |
| 2003/0084448 A1 | 5/2003 | Soundararajan | |
| 2003/0093311 A1* | 5/2003 | Knowlson | G06Q 30/02 705/14.66 |
| 2003/0093790 A1 | 5/2003 | Logan et al. | |
| 2003/0105719 A1 | 6/2003 | Berger et al. | |
| 2003/0112467 A1 | 6/2003 | McCollum et al. | |
| 2003/0126613 A1* | 7/2003 | McGuire | H04N 21/44222 725/109 |
| 2003/0237095 A1* | 12/2003 | Srinivas | H04H 60/46 725/46 |
| 2004/0140989 A1* | 7/2004 | Papageorge | H04W 4/14 715/700 |
| 2004/0176958 A1* | 9/2004 | Salmenkaita | H04M 1/72561 704/275 |
| 2004/0204063 A1* | 10/2004 | Van Erlach | H04L 67/04 455/556.1 |
| 2004/0261096 A1 | 12/2004 | Matz | |
| 2004/0261112 A1* | 12/2004 | Hicks, III | H04N 7/17318 725/89 |
| 2004/0268386 A1 | 12/2004 | Logan et al. | |

OTHER PUBLICATIONS

Satyanarayanan, "Pervasive Computing: Vision and Challenger", IEEE Personal Communications, Aug. 2001, 10 pages.

Satyanarayanan, "Mobile Information Access", IEEE Personal Communications, Feb. 1996, pp. 26-33.

Debaty et al., "Uniform Web Presence Architecture for People, Place and Things", IEEE Personal Communications, Aug. 2001, 12 pages.

Zimmeran, "Wireless Networked Digital Devices: A New Paradigm for Computing and Communication", IBM Systems Journal, vol. 38, No. 4, 1999, pp. 566-574.

The book "Digital Video: An Introduction to MPEG-2 (Digital Multimedia Standards Series)" by Haskell et al., Chapman and Hall, 1996.

* cited by examiner

FIG. 7

USER PROFILE (618)

Information Sources (704)

| cnn, nbc, abc, cbs, yahoo, realaudio |

Information Priorities: (706)

| AT&T, economy, terrorism, severe weather, New York City, medicine |

Duration of Information Summary: (708)

| 30 minutes |

Eliminate duplication ? ☒ ~710

[Submit] ~712        714~ [Cancel]

VIEWING HISTORY

CNN, Greenspan predicts recovery from recession
NBC, House committee hears Greenspan testimony
Yahoo, Dow rises on Greenspon testimony
ABC, Greenspan testimony boosts Dow and Nasdaq NBC, Severe blizzard in Midwest
CBS, Midwest airports closed
Yahoo, Heavy snow causes transportation shutdowns CNN, Recovery efforts continue at World Trade Center
ABC, Bush package gives 21 billion dollars to New York City
CBS, Rebuilding plans for lower Manhattan CBS, Bloomberg discusses budget shortfall
Realaudio, Interview with Michael Bloomberg CNN, Advances in anti-aging research
Realaudio, Interview with medical researcher

| Previous | ~ 812    814 ~ | Next |

FIG. 14

1402 — `<?xml version="1.0" encoding="US_ASCII"?>`
1404 — `<!ELEMENT content-metadata (radio, television, web)>`
1406 — `<!ELEMENT radio (title, source, date, time, duration, keywords)>`
1408 — `<!ELEMENT television (title, source, date, time, duration, keywords)>`
1410 — `<!ELEMENT web (title, source, keywords)>`
1412 — `<!ELEMENT title (#PCDATA)>`
1414 — `<!ELEMENT source (#PCDATA)>`
1416 — `<!ELEMENT date (#PCDATA)>`
1418 — `<!ELEMENT time (#PCDATA)>`
1420 — `<!ELEMENT duration (#PCDATA)>`
1422 — `<!ELEMENT keywords (#PCDATA)>`
1424 — `<!ELEMENT reporter (#PCDATA)>`

FIG. 15

1502 — `<?xml version="1.0" encoding="US-ASCII"?>`
1504 — `<content-metadata>`
1506 — `<radio>`
1508 — `<title?>Stem Cell Research`
1510 — `<source/>ABC News`
1512 — `<date/>April 25, 2002`
1514 — `<time/>9:17 AM EST`
1516 — `<duration/>4.0 minutes`
1518 — `<keywords/>medicine, genetic engineering, pharmaceuticals`
1520 — `<reporter/>Peter Jennings`
1522 — `</radio>`
1524 — `</content-metadata>`

FIG. 16

1602 — <?xml version="1.0" encoding="US-ASCII"?>
1604 — <content-metadata>
1606 — <television>
1608 — <title/>News report about genetic engineering
1610 — <source/>CBS News
1612 — <date/>April 20, 2002
1614 — <time/>6:45 PM EST
1618 — <duration/>3.5 minutes
1620 — <keywords/>medicine, genetic engineering, pharmaceuticals
1622 — <reporter/>Dan Rather
1624 — </television>
1626 — </content-metadata>

FIG. 17

1702 — <?xml version="1.0" encoding="US-ASCII"?>
1704 — <content-metadata>
1706 — <web>
1708 — <title/>News report about genetic engineering
1710 — <source/>http://www.pbs.org/science/gene-therapy.ra
1712 — <date/>April 20, 2002
1714 — <time/>6:45 PM EST
1716 — <duration/>5.0 minutes
1718 — <keywords/>medicine, genetic engineering, pharmaceuticals
1720 — <reporter/>Alan Alda
1722 — </web>
1724 — </content-metadata>

METHOD AND APPARATUS FOR DELIVERING SELECTED MULTIMEDIA CONTENT TO A USER IN PERVASIVE COMPUTING ENVIRONMENTS

PRIORITY INFORMATION

The present application is a continuation of U.S. patent application Ser. No. 10/192,212, filed Jul. 10, 2002, the content of which is incorporated by reference in its entirety.

FIELD OF THE INVENTION

This invention relates to multimedia content delivery in pervasive computing environments. Specifically, a method and apparatus are defined to customize delivery and minimize duplication of information for users in the environments.

BACKGROUND OF THE INVENTION

A pervasive computing environment contains a high density of mobile and non-mobile information devices. IT provides easy access to information at any time, from any place, on any device. These devices span a wide range of complexity. They include set top boxes, stereos, radios, televisions, and other applications that are familiar to consumers. They also include handheld and wearable devices that are embedded in clothing and jewelry. These devices can adapt their behavior to their user and surroundings.

There are many research and prototyping activities in this field. The article "Pervasive Computing: Vision ad Challenges" by Satyanarayanan in IEEE Personal Communications, August 2001 is an excellent overview of these efforts. It is incorporated by reference. Other relevant articles include "Mobile Information Access" by Satyanarayanan in IEEE Personal Communications, February 1996 and "Uniform Web presence Architecture for People, Places, and Things" by Debaty and Caswell in IEEE Personal Communications, August 2001.

Personal area networks (PANS) allow devices in the same environment to establish wireless connections, discover resources, and share information. The article "Wireless Networked Digital Devices: A New Paradigm for Computing and Communication" by Zimmerman in IBM Systems Journal, Volume 38, Number 4, 1999 provides an excellent overview of these technologies. Bluetooth, IrDA, and HomeRF are examples of wireless technologies. Specifications are available at http://www.bluetooth.org, http://www.irda.org, and http://www.homerf.org, respectively. Users in pervasive computing environments receive information from many sources. Radio and television stations transmit news programs containing reports about local, national, and international events. Streaming and non-streaming multimedia content is available from the Internet.

These sources often duplicate information. Competing television stations discuss the same events. Each broadcaster duplicates reports on their local and national programs. Information from popular Web portals duplicates that which is available from radio and television stations. For example, a consumer may visit a Web portal and learn about important news developments of the day. The information may be repeated on a radio program during a commute home. Finally, a television program delivered by a set top box may also report the same information.

Consumers need an efficient way to assimilate this information. Duplication should be minimized unless a user specifically requests additional details or perspectives on an event or topic. Maximum benefit must be obtained from the time spent viewing news and other information.

SUMMARY

Limitations of the prior art are overcome and technical advance is made by the present invention. It minimizes duplication of information and, therefore, enables a user to efficiently assimilate information from many different content providers (e.g. radio, television, and Web) in pervasive computing environments.

Content providers generate and transmit metadata for their information. This metadata provides additional detail about the content (e.g. content provider, date/time of delivery, topic, duration).

Mobile and non-mobile devices (e.g. personal computers, personal digital assistants, radios, set top boxes, televisions) are enhanced to contain short-range wireless transceivers. The devices use these transceivers to communicate with each other and select content that is most valuable for a consumer and do not duplicate information that has already been received by that individual.

In an embodiment of this invention, mobile devices maintain a user profile and viewing history. The user profile specifies the topics in which the user has an interest. A priority may be assigned to each topic. Preferences for different content providers may also be indicated. The viewing history stores metadata for information that has already been received by that individual.

A typical usage scenario is: (1) A mobile device establishes wireless communication with a non-mobile device in an environment. (2) The mobile device transmits a user profile and viewing history to the non-mobile device. (3) The non-mobile device uses this data to select and sequence content for that user. (4) As the non-mobile device presents content, it transmits metadata associated with that content. (5) The mobile device receives this metadata and updates its viewing history.

A mobile device can establish transient wireless communication with a sequence of non-mobile devices in one or more pervasive computing environments. Communication is established when the mobile and non-mobile device are in proximity to each other.

BRIEF DESCRIPTION OF THE DRAWINGS

The above-summarized invention will be more fully understood upon consideration of the following detailed description and the attached drawings wherein:

FIG. 7 shows a graphical user interface for examining and modifying the user profile that is stored on a mobile device.

FIG. 8 shows a graphical user interface for examining the viewing history that is stored on a mobile device.

FIG. 14 shows a sample schema for content metadata.

FIG. 15 shows sample metadata for radio content.

FIG. 16 shows sample metadata for television content.

FIG. 17 shows sample metadata for web content.

DETAILED DESCRIPTION

Figure 1:
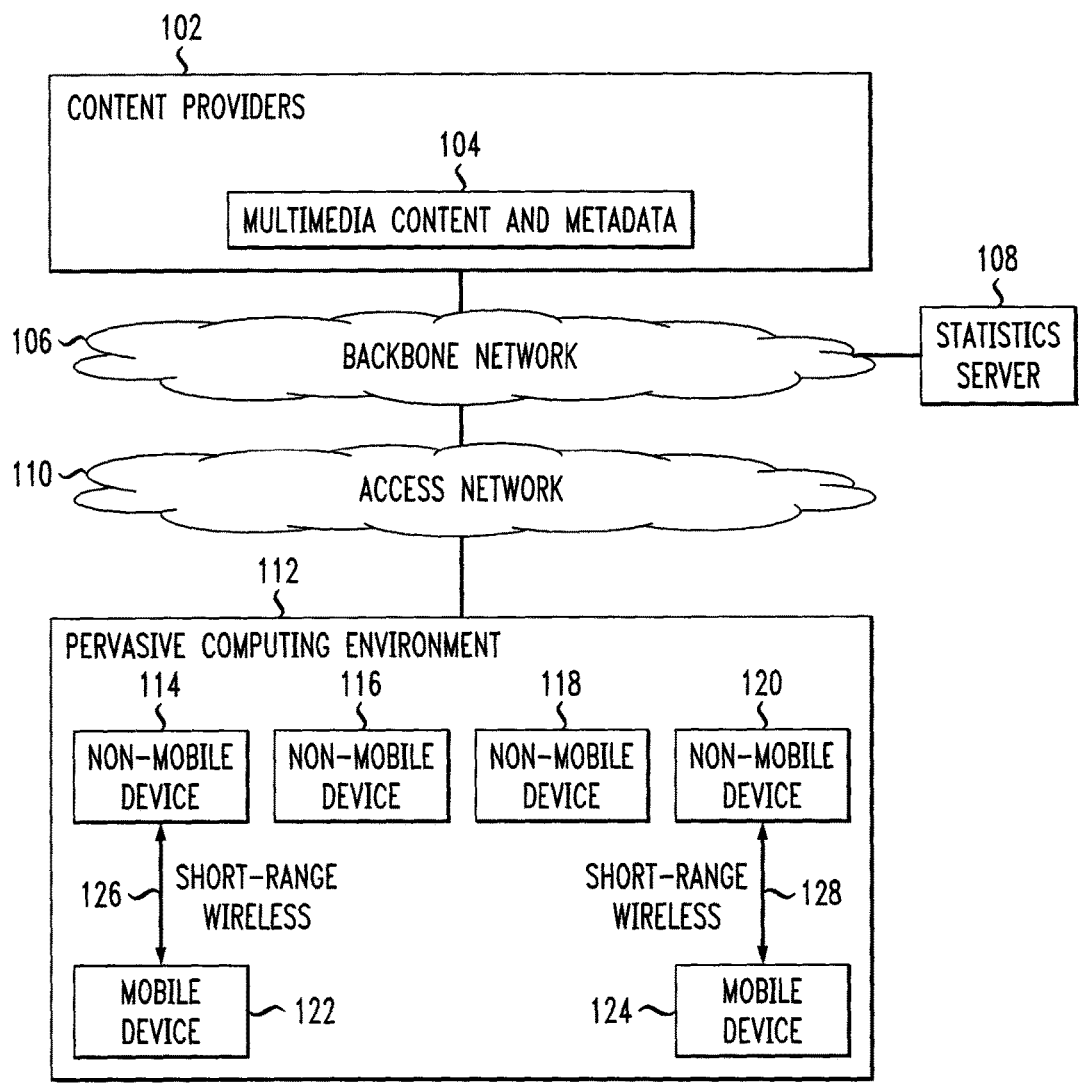
FIG. 1 shows the system architecture for the first embodiment of the present invention.

FIG. 1 shows the system architecture for the first embodiment of the present invention. Content providers 102 generate multimedia content and metadata that is stored in a server 104 (e.g. streaming and non-streaming Internet content, television programs, or radio programs). This information is accessible via backbone network 106. Backbone network 106 can use wide area network technologies in the current art (e.g. circuit switching, packet switching). Multiple access networks 110 connect to the backbone network 106. Access network 110 can use a variety of technologies in the current art (e.g. hybrid fiber coax, digital subscriber loop, wireless).

The current art provides techniques by which content providers may generate, store, and transmit metadata for their information. For example, the MPEG-2 video format enables metadata to be transmitted as a component of a digital video stream. The book "Digital Video: An Introduction to MPEG-2 (Digital Multimedia Standards Series)" by Haskell et al., Chapman and Hall, 1996 provides details.

Multiple pervasive computing environment 112 may contain non-mobile devices 114-120 and mobile devices 122-124. Mobile devices 122-124 enter and exit these environments. Transient short-range wireless connections 126-128 are automatically established between a mobile device and a non-mobile device via techniques in the current art.

As a mobile device 122 moves within an environment 112 (or moves among environments), connections are dynamically established and dropped to devices. Data is exchanged that enables the devices to adjust their behavior for the user of the mobile device and minimize repetitive presentation of information.

A statistics server 108 can accumulate statistics on the content that is selected for presentation. It can also accumulate statistics about advertising that is inserted into the presentation. Reports can be generated for all of these activities. This data can be shared with content providers for a fee.

Figure 2:
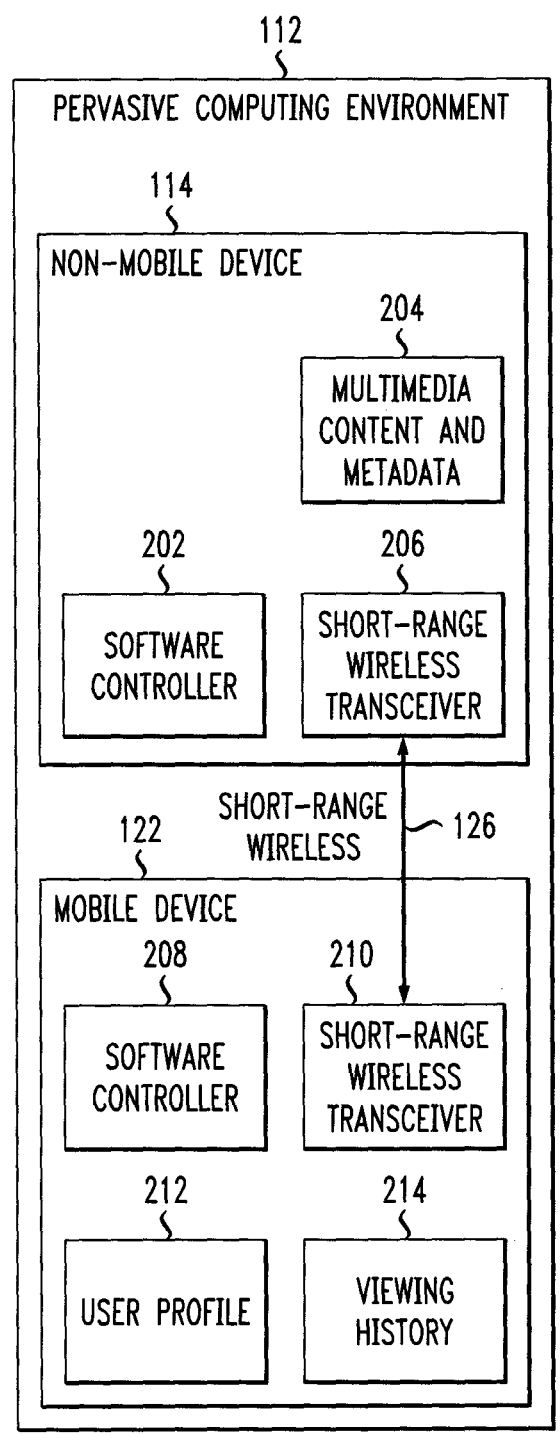
FIG. 2 shows additional detail for a non-mobile and mobile device.

FIG. 2 shows additional detail for an exemplary non-mobile device 114 and an exemplary mobile device 122 in an environment 112. The non-mobile device 114 contains a software controller 202, a server having stored multimedia content and metadata 204, and a short-range wireless transceiver 206. Components of the software controller may be dynamically downloaded to the device by using Java software technology. See http://www.javasoft.com for additional details. The mobile device 122 contains a software controller 208, short-range wireless transceiver 210, user profile 212 and viewing history 214. The user profile is generated based on data gathered by the mobile device 122 and preferences inputted by the user. Such preferences can include the type of content that is of interest to the user, the subject matter of interest, dates of interest, etc. The viewing history is compiled by the mobile device 122 based on the data gathered from the short-range wireless transceiver 210. As the user travels from one environment to another, the content that the user is exposed to is captured by the short-range wireless transceiver 210. This data is used to help filter out desired content stored on the non-mobile device. This user profile and viewing history 214 are transmitted to a non-mobile device 114 so it can customize its behavior for the owner of the mobile device.

Figure 3:
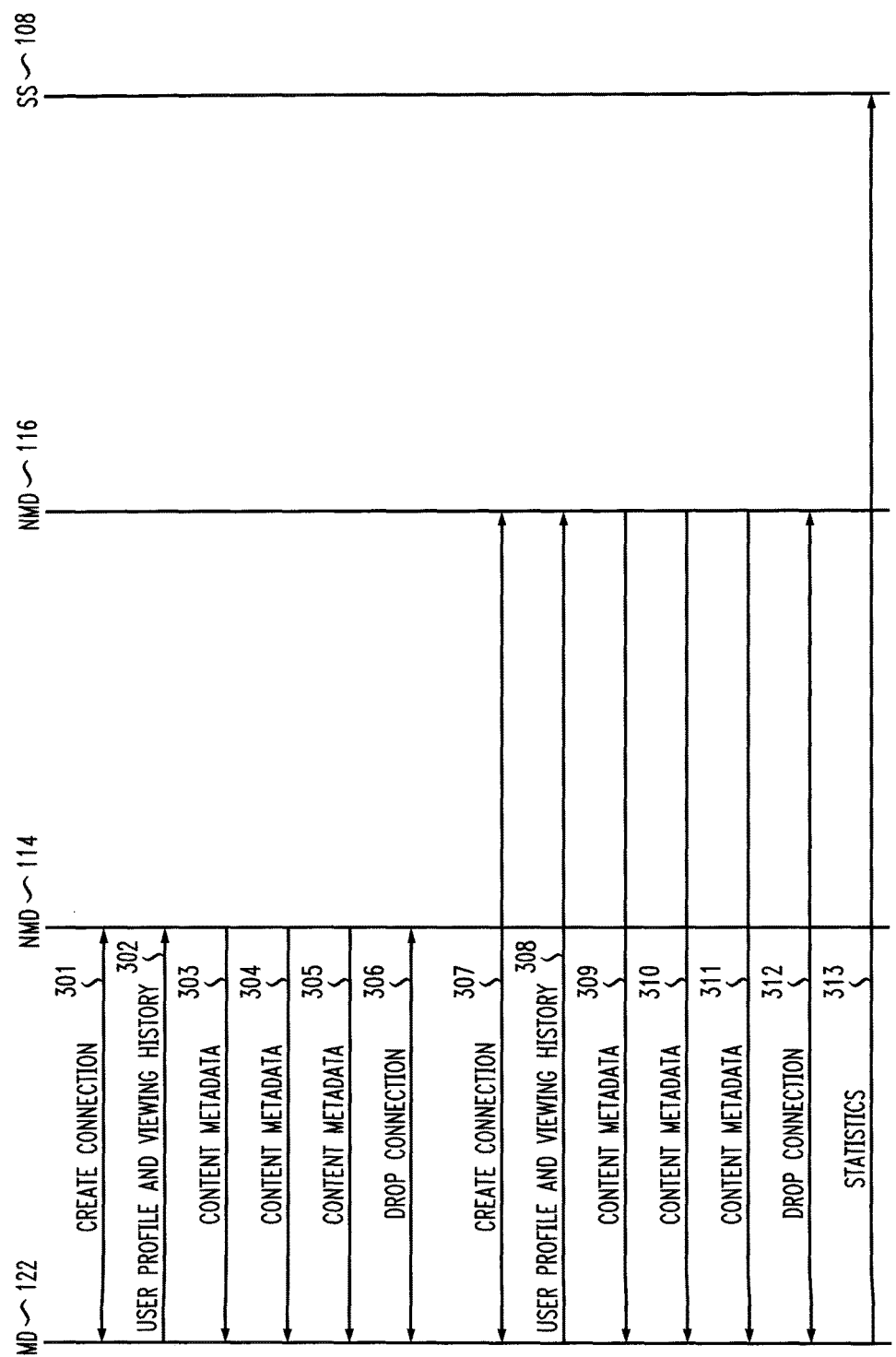
FIG. 3 shows the message sequence for the first embodiment of the present invention.

FIG. 3 shows how a mobile device 122 interacts with two non-mobile devices 114-116 and a statistics server 106. The mobile device 122 and non-mobile device 114 establish a connection via messages 301 according to techniques in the current art. Message 302 is then transmitted to the non-mobile device. This message contains the user profile and viewing history. The non-mobile device uses this data to select and sequence stored multimedia content. As content is presented, the metadata for the content is transmitted to the mobile device 122. This done by messages 303-305. This metadata is stored in the viewing history 214 on the mobile device 114. This is shown as 306 on the diagram.

The mobile device 122 and non-mobile device 116 establish a connection via messages 307 according to techniques in the current art. Message 308 is then transmitted to the non-mobile device. This message contains the user profile and viewing history. The non-mobile device 116 uses this data to select and sequence stored multimedia content. As content is presented, the metadata for that content is transmitted to the mobile device 122. This is done by messages 309-311. This metadata is stored in the viewing history 214 on the mobile device. The mobile device 122 then drops its connection to non-mobile device 116. This is shown as 312 on the diagram.

The mobile device 122 may periodically transmit statistics to the statistics server 108. This data may indicate the specific multimedia content that was received by the mobile device. The statistics server can use this information to generate reports that can be distributed to content providers. Mobile devices may also be billed for this service.

Figure 4:
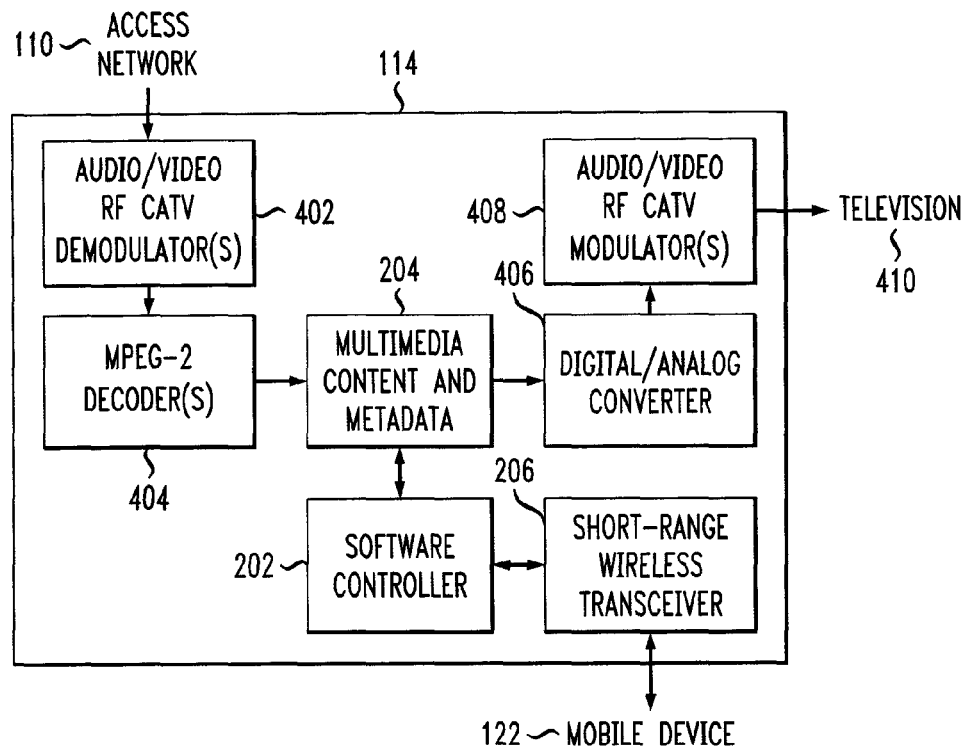
FIG. 4 shows a block diagram of a representative non-mobile device (viz. cable television set top box).

FIG. 4 shows a block diagram of a representative non-mobile device 114 (e.g. cable television set top box). The set top box connects to the access network 110 (e.g. hybrid fiber coax network) and receives television signals. These signals are supplied to one or more audio/video RF CATV demodulators 402. Output from the demodulators is supplied to one or more MPEG-2 decoders 404. Output from the decoders is stored in the multimedia content and metadata storage server 204.

The software controller 202 receives requests from a mobile device 122 via the short-range wireless transceiver 206. In response to these requests, the software controller 202 examines the metadata in server 204 and selects a subset of the content for that user. The content is retrieved from server 204 and output via digital/analog converter 406 and audio/video RF CATV modulator 408 to a television 410. The content can be viewed immediately or scheduled for viewing at a later date and/or time.

Several products in the current art can be enhanced for the present invention. For example, digital video recorders are available from TiVO, Replay TV, and Microsoft. These products can be programmed to receive and store digital television content. Additional details can be found at http://www.tivo.com, http://www.replaytv.com, http://www.microsoft.com.

Figure 5:
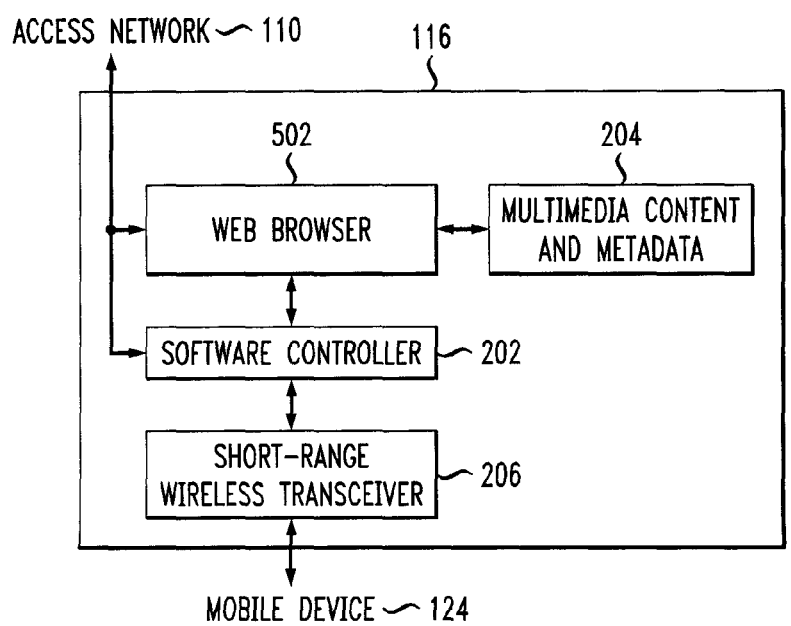
FIG. 5 shows a block diagram of a representative non-mobile device (viz. personal computer with Web browser).

FIG. 5 shows a block diagram of another representative non-mobile device 116 (e.g. personal computer). This device contains a Web browser 502. The software controller 202 receives requests from a mobile device 124 via the short-range wireless transceiver 206. In response to these requests, the software controller 202 examines the metadata in server 204 and selects a subset of the content for that user. The content is retrieved from server 204 and output via the Web browser 502.

Figure 6:
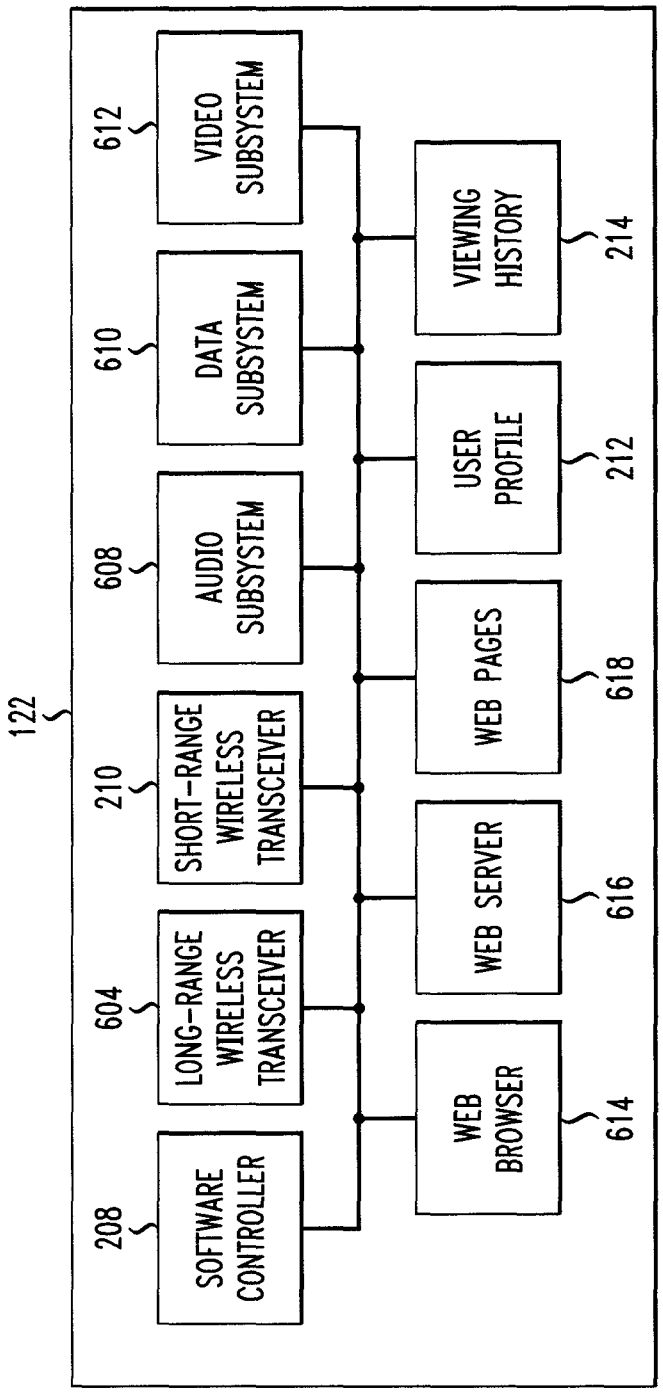
FIG. 6 shows a block diagram of a representative mobile device (viz. personal digital assistant).

FIG. 6 shows a block diagram of a representative mobile device 122 (e.g. cell phone, personal digital assistant). The software controller 208 coordinates execution of the various system components. Long-range wireless transceiver 604 is used for communication with a mobile switching center (MSC) in the current art. Short-range wireless transceiver 210 is used for communication with other devices in the local environment. The audio 608, data 610, and video 612 subsystems are used to input and output those specific media types. A Web browser 614 enables streaming and non-streaming multimedia content from the content providers 102 to be retrieved and displayed. A Web server 616 receives and processes requests for Web pages 618. These Web pages enable the user profile 212 to be examined and modified. They also enable the viewing history 214 to be examined. Any device disclosed herein can include hardware components such as a processor, a computing device, and/or a computer-readable storage medium or computer-readable storage device storing instructions for controlling the processor or the computing device to perform certain steps as disclosed herein.

FIG. 7 shows an exemplary Web page 618 for examining and modifying the user profile 212 that is stored on the mobile device 122. A user profile may specify a prioritized list of information sources 704. The information sources 704 may represent a number of different media such as broadcast, cable, web pages, audio downloads, etc. The sample data shows that the sources CNN, NBC, ABC, CBS, Yahoo and RealAudio are to be used. A user profile may also specify a prioritized list of topics 706. The sample data shows that the topics AT&T, economy, terrorism, severe weather, and New York City are to be used. The duration of an information summary 708 can also be defined. The sample data shows that the user wishes to view a composite information summary for thirty minutes. These thirty minutes will be filled with multimedia content that is retrieved from the content internally stored on the non-mobile device. A check box 7110 enables the user to request that duplication of information be minimized. A submit button 712 and cancel button 714 submit and cancel form submission.

FIG. 8 shows a Web page 618 for examining the viewing history 208 that is stored on the mobile device 122. The page contains hyperlinks to all of the content that has recently been viewed by the consumer. The hyperlinks are presented in the same sequence as the corresponding content was viewed. Previous 812 and next 814 buttons provide access to additional pages of hyperlinks. Each hyperlink allows the consumer to revisit the particular content described by the hyperlink.

Figure 9:
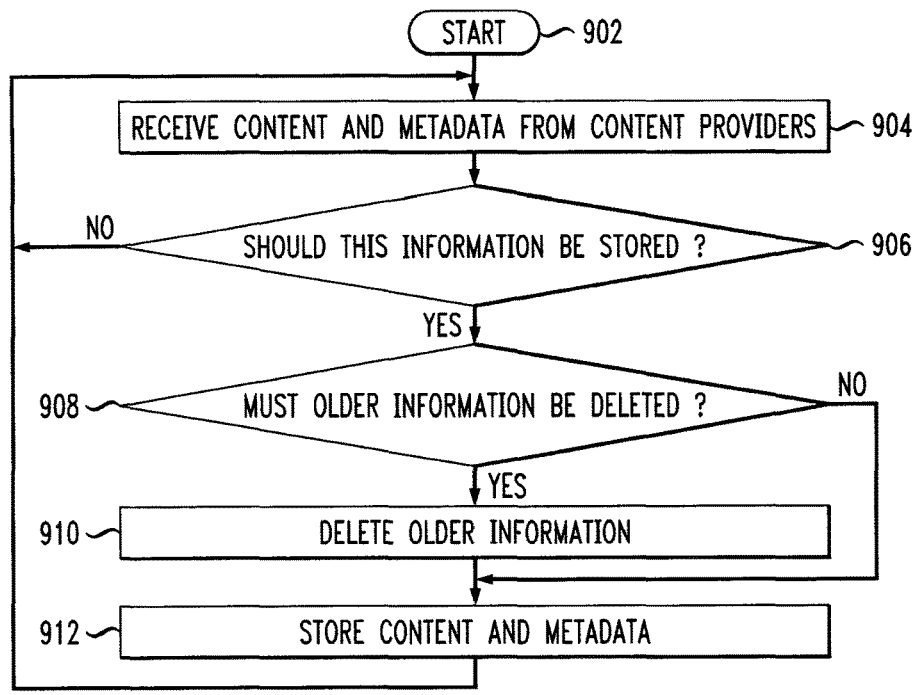
FIGS. 9-10 are flowcharts for a non-mobile device.

FIG. 9 is a flowchart for a non-mobile device 114. It shows the execution of a thread that receives multimedia content and metadata from content providers and decides if that information will be saved in storage 202. Execution begins at step 902. Multimedia content and metadata is received from content providers at step 904. A decision is made at step 906 if this information should be saved. If not, execution continues at step 904. Otherwise, it is determined if older information must be deleted to obtain sufficient storage for this new information at step 908. If no, execution continues at step 912. Otherwise, execution continues at step 910 and the older information is deleted. The new content and metadata is saved in storage 202 at step 912. The routine is then repeated beginning at step 904.

Figure 10:
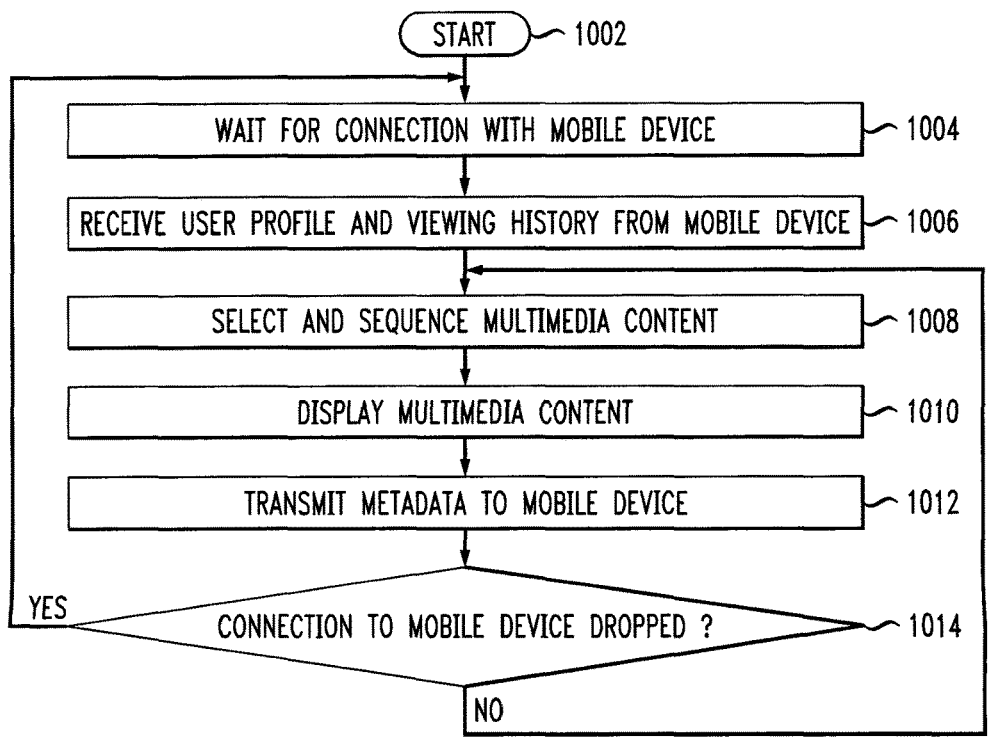

FIG. 10 is a flowchart for a non-mobile device 114. It shows the execution of a thread that waits for a connection from a mobile device 122 and communicates with the device. Execution begins at step 1002. Execution blocks at step 1004 until a short-range wireless connection 126 is established with mobile device 122. The user profile 206 and viewing history 208 are received from that mobile device at step 1006. Based on this information, multimedia content is selected from storage 202 at step 1008. The sequence in which this content will be displayed is also determined. The multimedia content is displayed at step 1010. The metadata for that content is transmitted to mobile device 122 at step 1012. A check is done at step 1014 to determine if the connection to the mobile device has dropped. If yes, execution continues at step 1004. Otherwise, execution continues at step 1008.

Figure 11:
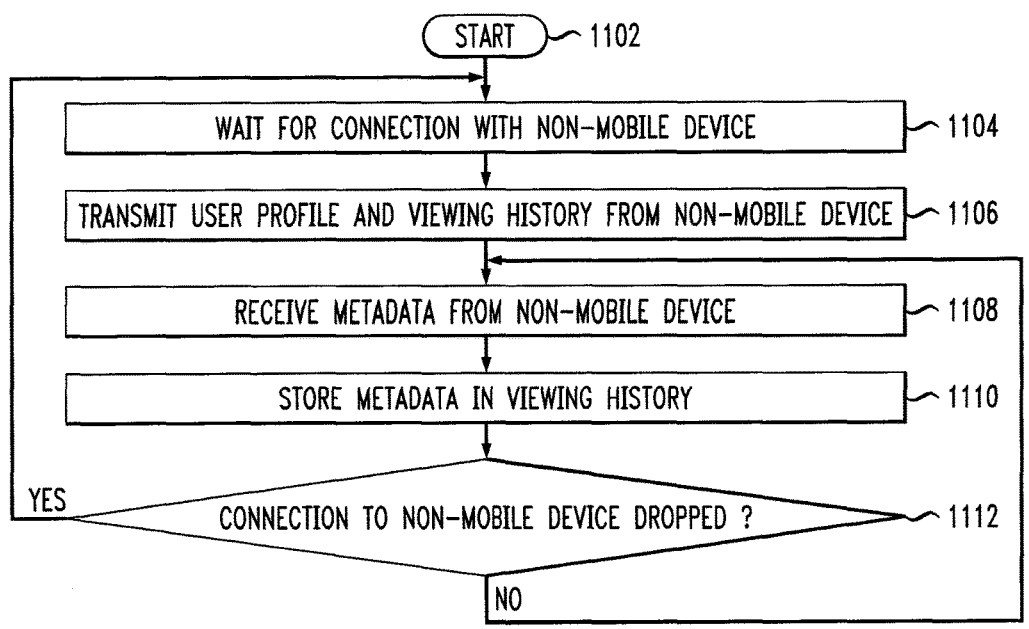
FIG. 11 is a flowchart for a mobile device.

FIG. 11 is a flowchart for a mobile device 122. Execution starts at step 1102. Execution blocks at step 1104 until a short range wireless connection 126 is established with a non-mobile device 114. The user profile 212 and viewing history 214 are transmitted to the non-mobile device at step 1106. The non-mobile device uses that data as outlined in FIG. 10. Execution blocks at step 1108 until metadata is received from the non-mobile device. This metadata is stored in a viewing history 214 at step 1110 A check is done at step 1112 to determine if the connection to the non-mobile device was dropped. If yes, execution continues at step 1104. Otherwise, execution continues at step 1108.

Figure 12:
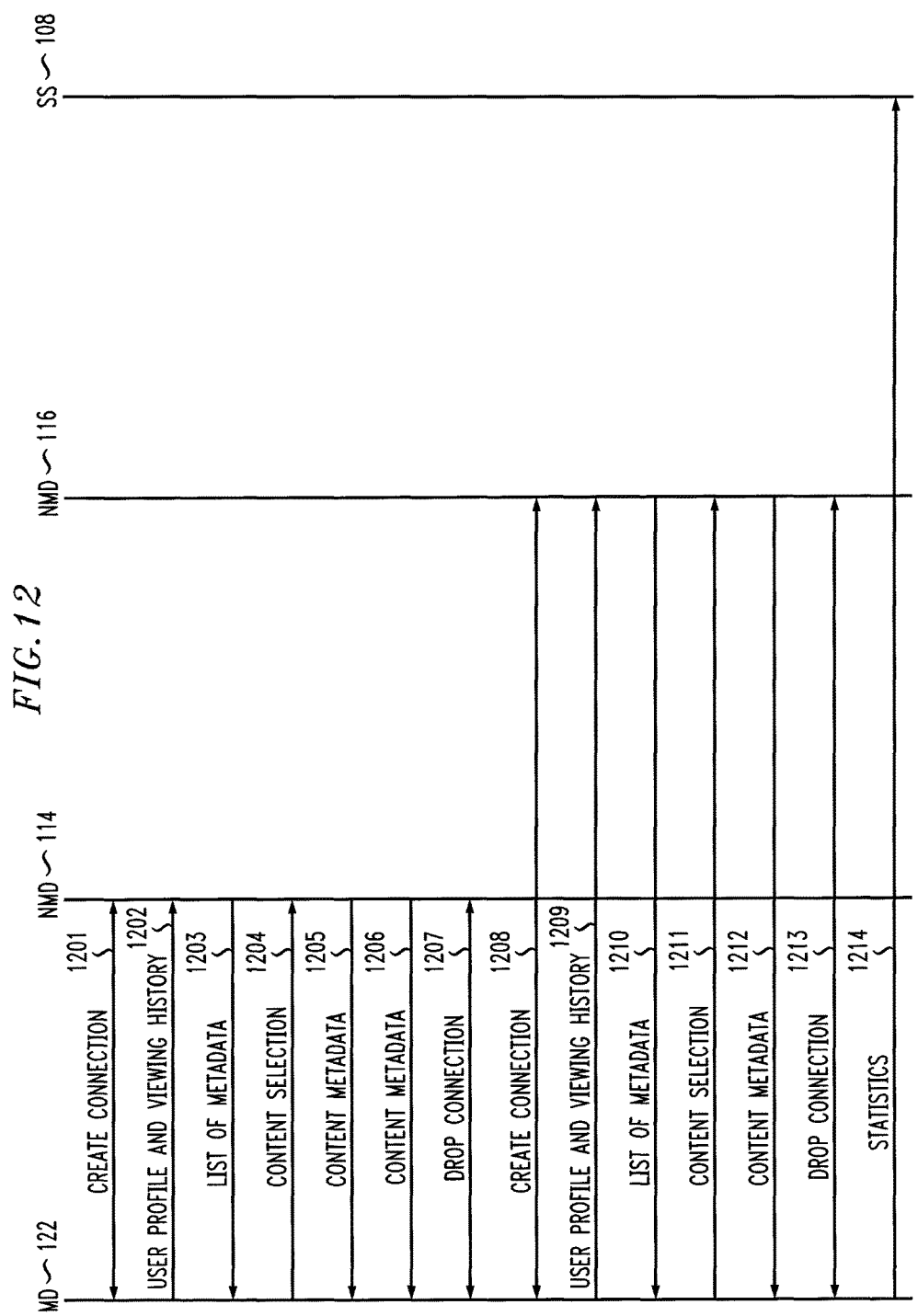
FIG. 12 shows the message sequence for the second embodiment of the present invention.

FIG. 12 shows how a mobile device 122 interacts with two non-mobile devices 114-116 and a statistics server 108. The mobile device 122 and non-mobile device 114 establish a connection via messages 1201 according to techniques in the current art. Message 1202 is then transmitted to the non-mobile device. This message contains the user profile and viewing history. The non-mobile device uses this data to select stored multimedia content. Metadata for the selected content is returned to the mobile device as message 1203. The mobile device examines this metadata and selects and sequences the content for the user. The selection is transmitted to the non-mobile device 114 as message 1204. As content is presented, the metadata for that content is transmitted to the mobile device 122. This is done by messages 1205-1206. This metadata is stored in the viewing history 214 on the mobile device. The mobile device 122 then drops its connection to the non-mobile device 114. This is shown as 1207 on the diagram.

The mobile device 122 and non-mobile device 116 establish a connection via messages 1208 according to techniques in the current art. Message 1209 is then transmitted to the non-mobile device. This message contains the user profile and viewing history. The non-mobile device uses this data to select stored multimedia content. Metadata for the selected content is returned to the mobile device as message 1210. The mobile device examines this metadata and selects and sequences the content for the user. The selection is transmitted to the non-mobile device 116 as message 1211. As content is presented, the metadata for that content is transmitted to the mobile device 122. This is done by message 1212. This metadata is stored in the viewing history 214 on the mobile device. The mobile device 122 then drops its connection to non-mobile device 116. This is shown as 1213 on the diagram.

The mobile device 122 may periodically transmit statistics to the statistics server 108. This data may indicate the specific multimedia content that was received by the mobile device. The statistics server can use this information to generate reports that can be distributed to content providers. Mobile devices may also be billed for this service.

Figure 13:
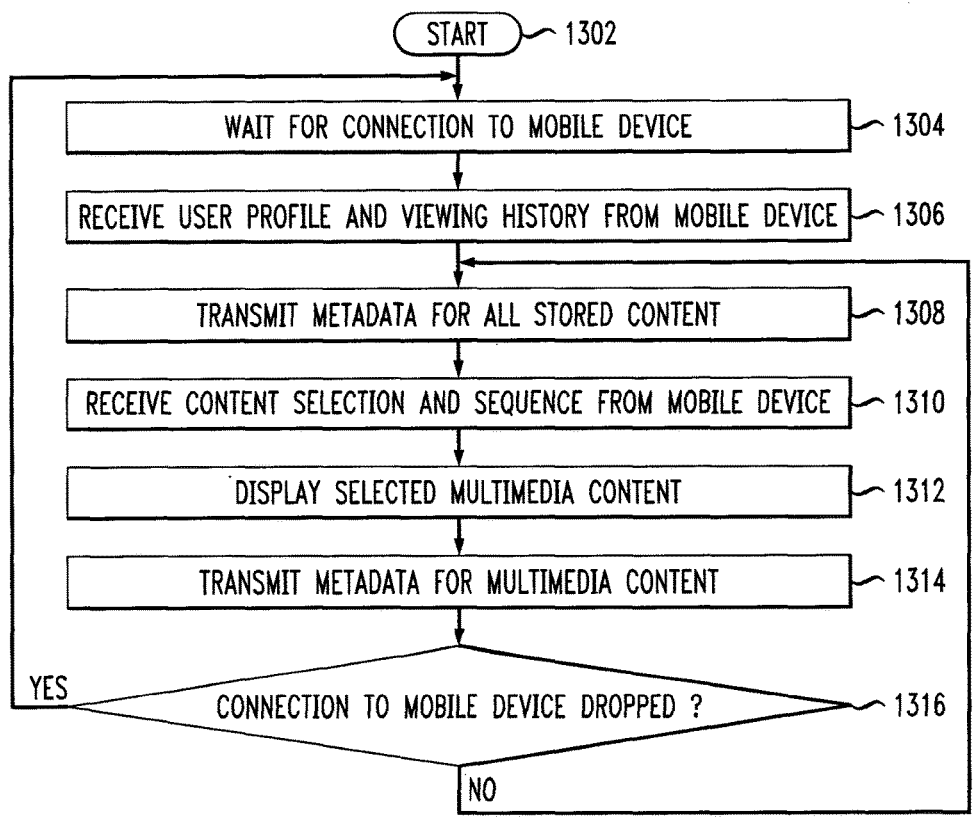
FIG. 13 shows a flowchart for a non-mobile device.

FIG. 13 is a flow chart for non-mobile device 114. It shows the execution of a thread with mobile device 122 to determine what metadata should be communicated to mobile device 122. Execution begins at step 1302. Non-mobile device 114 waits for connection to mobile device 122 at step 1304. The non-mobile device 114 receives a user profile and viewing history from mobile device 122 at step 1306. Metadata is transmitted from non-mobile device 114 to mobile 122 that describes all of the content stored by non-mobile device 114 at step 1308. The mobile device 122 selects content based on the metadata and transmits its content selection and the sequencing for that content at step 1310. The selection multimedia content is displayed by non-mobile device 114 at step 1312. The metadata for the selected content is transmitted to the mobile device at step 1314. A determination is made as to whether the connection to the mobile device has been dropped at step 1316. If the connection has been dropped, the non-mobile device waits for connection to the same or another mobile device and execution returns to step 1304. If the connection has not been dropped, the non-mobile device retransmits a list of all stored content to the mobile device and execution continues at step 1308.

FIG. 14 shows a sample generic schema for content media that is transmitted to a mobile device. The schema comprises a plurality of elements that are used to identify multimedia content stored by a non-mobile device and available to the user. Included in these elements is an element 1402 that describes the content type. Types of content include, but are not limited to, radio, television, web pages, etc. Elements 1404, 1406 and 1408 illustrate specific elements for particular types of media. Element 1404 lists the metadata for radio content and includes data such as title, source, date, time, duration of content and keywords associated with the content. Element 1406 lists the metadata for television content and includes data such as title, source, date, time, duration and keywords. Element 1408 lists the metadata for web-based content and includes title, source and keywords. Each data piece of the metadata description is then elaborated in elements 1410-1422.

FIG. 15 shows a more specific example of sample metadata for radio content. Associated with each of the data factors listed above (e.g., title, source, etc.) more detailed information is provided. In the current example, the multimedia content is a report on stem cell research. The source of the report (e.g., ABC news) is provided along with the data and time of the report and its duration. Any and all of the metadata can be searched to determine if the associated multimedia content is of interest to the user. The metadata is also used to reduce duplicity of content presented to the user.

FIG. 16 shows a more specific example of sample metadata for television content. Associated with each of the data factors listed above (e.g., title, source, etc.) more detailed information is provided. In the current example, the multimedia content is a report on genetic engineering. The source of the report (e.g., CBS news) is provided along with the data and time of the report and its duration. Whether the uses wishes to view this content may depend on a number of factors. Some considerations may be what content the user has already been exposed to as identified by the mobile device, historical data regarding the user's preferences (e.g., a preference for particular media, media sources, or reporters). Depending upon the amount of content that meets a user's preferences, the amount of content may need to be pared down. Such reduction may occur based on these factors.

FIG. 17 shows a more specific example of sample metadata for Web content. In the current example, the multimedia content is a report on genetic engineering. The source of the report (e.g., http://www.pbs.org/science/gene-therapy.ra) is provided along with the data and time of the report and its duration. Once all of the metadata is received by the mobile device, it is presented to the user. The user can then select any of the associated multimedia content for viewing and/or listening.

While the invention has been described with reference to specific embodiments, modifications and variations of the invention may be constructed without departing from the scope of the invention that is defined in the following claims.

I claim:

1. A method comprising:
   receiving, at a home electronic device, from a mobile device and over a short-range wireless protocol, a user profile and a history listing a title of each program of previously-viewed multimedia content that was previously viewed on the mobile device, wherein the user profile comprises preferences for content providers;
   based on the user profile having preferences of content providers, selecting a content provider;
   selecting multimedia content, from the content provider, based on the user profile and the previously-viewed multimedia content on the mobile device to yield a chosen multimedia content; and
   transmitting, from the home electronic device and to the mobile device, the chosen multimedia content and metadata associated with the chosen multimedia content, wherein the chosen multimedia content is received from the content provider and results in a reduction in duplicate content being transmitted to one of the home electronic device and the mobile device relative to an amount of content that would be transmitted to one of the home electronic device and the mobile device without the selecting of the multimedia content and the transmitting of the chosen multimedia content and the metadata associated with the chosen multimedia content.

2. The method of claim 1, wherein the mobile device is a cell phone, and the chosen multimedia content comprises video content.

3. The method of claim 1, wherein the chosen multimedia content comprises audio content.

4. The method of claim 1, wherein the user profile comprises preferences defined by a user associated with the user profile.

5. The method of claim 1, wherein the user profile indicates a topic of interest to a user.

6. The method of claim 1, wherein the history of previously viewed multimedia content comprises a content provider, a topic of content, and a duration of content.

7. A home electronic device comprising:
   a hardware processor; and
   a non-transitory computer-readable storage medium having instructions stored which, when executed by the hardware processor, cause the hardware processor to perform operations comprising:
      receiving, at the home electronic device and from a mobile device over a short-range wireless protocol, a user profile and a history of previously viewed multimedia content on the mobile device, wherein the user profile comprises preferences for content providers;
based on the user profile having preferences for content providers, selecting a content provider;
selecting, from the content provider, a chosen multimedia content based on the user profile and the history of previously viewed multimedia content on the mobile device; and
transmitting, from the home electronic device and to the mobile device, the chosen multimedia content and metadata associated with the chosen multimedia content, wherein the chosen multimedia content is received from the content provider and results in a reduction in duplicate content being transmitted to one of the home electronic device and the mobile device relative to an amount of content that would be transmitted to one of the home electronic device and the mobile device without the selecting of the multimedia content and the transmitting of the chosen multimedia content and the metadata associated with the chosen multimedia content.

8. The home electronic device of claim 7, wherein the mobile device is a cell phone, and the chosen multimedia content comprises video content.

9. The home electronic device of claim 7, wherein the chosen multimedia content comprises audio content.

10. The home electronic device of claim 7, wherein the user profile comprises preferences defined by a user associated with the user profile.

11. The home electronic device of claim 7, wherein the user profile indicates a topic of interest to a user.

12. The home electronic device of claim 7, wherein the history of previously viewed multimedia content comprises a content provider, a topic of content, and a duration of content.

13. A non-transitory computer-readable storage device having instructions stored which, when executed by a computing device, cause the computing device to perform operations comprising:

receiving, at the computing device and from a mobile device over a short-range wireless protocol for use in a home, a user profile and a history of previously viewed multimedia content on the mobile device, wherein the user profile comprises preferences for content providers;
based on the user profile having preferences for content providers, selecting a content provider;
selecting a chosen multimedia content, from the content provider, based on the user profile and the history of previously viewed multimedia content on the mobile device; and
transmitting, from the computing device and to the mobile device, the chosen multimedia content and metadata associated with the chosen multimedia content, wherein the chosen multimedia content is received from the content provider and results in a reduction in duplicate content being transmitted to one of the home electronic device and the mobile device relative to an amount of content that would be transmitted to one of the home electronic device and the mobile device without the selecting of the multimedia content and the transmitting of the chosen multimedia content and the metadata associated with the chosen multimedia content.

14. The non-transitory computer-readable storage device of claim 13, wherein the mobile device is a cell phone, and the chosen multimedia content comprises video content.

15. The non-transitory computer-readable storage device of claim 13, wherein the chosen multimedia content comprises audio content.

16. The non-transitory computer-readable storage device of claim 13, wherein the user profile comprises preferences defined by a user associated with the user profile.

17. The non-transitory computer-readable storage device of claim 13, wherein the user profile indicates a topic of interest to a user.

* * * * *